United States Patent [19]

Bando

[11] Patent Number: 5,276,999
[45] Date of Patent: Jan. 11, 1994

[54] MACHINE FOR POLISHING SURFACE OF GLASS PLATE

[75] Inventor: Shigeru Bando, Tokushima, Japan
[73] Assignee: Bando Kiko Co., Ltd., Tokushima, Japan
[21] Appl. No.: 820,631
[22] PCT Filed: Jun. 6, 1991
[86] PCT No.: PCT/JP91/00765
    § 371 Date: Jan. 24, 1992
    § 102(e) Date: Jan. 24, 1992
[87] PCT Pub. No.: WO91/19593
    PCT Pub. Date: Dec. 26, 1991

[30] Foreign Application Priority Data
    Jun. 9, 1990 [JP] Japan .................. 2-151268
    Jun. 12, 1990 [JP] Japan .................. 2-154528

[51] Int. Cl.⁵ .................. B24B 7/04; B24B 7/06; B24B 21/06
[52] U.S. Cl. .................. 51/62; 51/61; 51/141; 51/142; 51/144; 51/215 E; 51/283 R
[58] Field of Search .................. 51/62-63, 141, 142, 143, 144, 147, 145 R, 145 T, 135 R, 215 Ar, 215 CP, 215 E, 283 R

[56] References Cited

U.S. PATENT DOCUMENTS

| | | | |
|---|---|---|---|
| 2,272,729 | 2/1942 | Searing | 15/4 |
| 3,668,814 | 6/1972 | Freerks et al. | 51/144 |
| 3,888,050 | 6/1975 | Elm | 51/141 X |
| 4,257,195 | 3/1981 | Appelgren | 51/216 R |
| 4,407,096 | 10/1983 | Steinback | 51/142 X |
| 4,512,110 | 4/1985 | Stump | 51/141 |
| 4,635,405 | 1/1987 | Stump | 51/145 T |

FOREIGN PATENT DOCUMENTS

| | | |
|---|---|---|
| 29039962 | 8/1980 | Fed. Rep. of Germany . |
| 47-23995 | 10/1972 | Japan . |
| 48-30197 | 4/1973 | Japan . |
| 48-79394 | 10/1973 | Japan . |
| 49-13678 | 4/1974 | Japan . |
| 50-77998 | 6/1975 | Japan . |
| 50-130095 | 10/1975 | Japan . |
| 1528648 | 12/1989 | U.S.S.R. .................. 51/216 R |

*Primary Examiner*—Bruce M. Kisliuk
*Assistant Examiner*—Bo Bounkong
*Attorney, Agent, or Firm*—Nixon & Vanderhye

[57] ABSTRACT

A machine 80 for polishing a surface of a glass plate 20, comprising a polishing belt 1 provided with a polishing layer in an outside surface thereof, a traveling unit 2 for traveling the polishing belt 1, a flatly supporting unit 21 for flatly supporting the polishing belt 1 in a polishing area for the glass plate 20, and a holding and pressing unit 31 for holding the glass plate 20 to be polished and for pressing the held glass plate against the outside surface of the polishing belt 1 flatly supported by the flatly supporting unit 21, and further comprising a swinging unit 61 for relatively swinging the glass plate 20 relative to the polishing belt 1 in a direction parallel to a plane in which the polishing belt 1 is supported by the flatly supporting unit 21, and in a direction traversing to a traveling direction of the polishing belt 1, the glass plate being held by the holding and pressing unite 31.

8 Claims, 5 Drawing Sheets

MACHINE FOR POLISHING SURFACE OF GLASS PLATE

TECHNICAL FIELD

The present invention relates to a polishing machine for polishing a surface of a glass plate to produce a glass plate in which smoothness and flatness with excellent accuracy are required, and which is used in such a display screen of a liquid crystal display device, an original supporting plate of a copying machine, and the like.

BACKGROUND ART

In a conventional surface polishing machine for a glass plate, as is typified by those manufactured in the Speedfirm Company, the glass plate is polished in a state in which abrasive material is supplied onto a rotating polishing base plate on which the glass plate is pressed by means of a holding pad unit which holds and rotates the glass plate.

In a further conventional surface polishing machine for polishing the surface of the glass plate, a holding pad member which holds a glass plate is also moved in an arc in addition to the above described means to flatly polish the surface of the plate glass.

In each of these conventional surface polishing machines, however, the polishing base plate is required to keep with extremely high flatness a plane in which the base plate is rotated. Due to this requirement, the polishing base plate is substantially limited in size, so that the glass plate to be polished is limited in the size thereof. In addition, since the polishing base plate is rotated, the abrasive material having supplied is immediately flowed radially outward by centrifugal force, so that it is difficult to constantly keep the abrasive material between the glass plate and the polishing base plate. In addition, since the rotating polishing base plate has an outer peripheral portion differ from inner peripheral portion in peripheral speed, it is hard to uniformly polish the surface of the glass plate. Further, in any of the conventional machines, it is necessary to stop rotation of the base plate each time the surface polishing operation of the glass plate is finished and the thus finished glass plate is replaced with a new one to be polished. Therefore, any of the conventional surface polishing machines is extremely poor in work rate.

In view of the above disadvantages, an object of the present invention is to provide a surface polishing machine for polishing a surface of glass plate with high flatness without any limitation of the size of glass plate to be polished.

It is another object of the present invention to provide a machine for polishing a surface of glass plate in a state in which abrasive material is kept in a suitable condition between the glass plate and a polishing base plate so as to further facilitate surface polishing operation.

It is further another object of the present invention to provide a surface polishing machine for polishing a surface of glass plate with extremely high uniformity.

It is still further object of the present invention to provide a machine for polishing a surface of glass plate with remarkably improved work rate in a surface polishing operation.

Disclosure of Invention

According to the present invention, the above objects are accomplished by a machine for polishing a surface of a glass plate, comprising a polishing belt provided with a polishing layer in an outside surface thereof, traveling means for traveling the polishing belt, flatly supporting means for flatly supporting the polishing belt in a polishing area in which the glass plate is polished, and a holding and pressing means for holding the glass plate to be polished and for pressing the thus held glass plate against the outside surface of the polishing belt flatly supported by the flatly supporting means.

According to the present invention, the above objects are also accomplished by the surface polishing machine which further comprises swinging means for relatively swinging the glass plate held by the holding and pressing means relative to the polishing belt in a direction parallel to a plane in which the polishing belt is supported by the flatly supporting means, and in a direction traversing a traveling direction of the polishing belt, the glass plate being held by the holding and pressing means.

In an embodiment of the surface polishing machine of the present invention, the swinging means is connected with the polishing belt to swing the polishing belt relative to the glass plate. On the other hand, in another embodiment of the surface polishing machine of the present invention, the swinging means is connected with the holding and pressing means to swing the glass plate relative to the polishing belt. Consequently, in the present invention, the swinging means may be so adapted to swing the holding and pressing means relative to the polishing belt in a plane, in which the polishing belt is supported by the flatly supporting means, and in a direction traversing the traveling direction of the polishing belt, wherein the holding and pressing means is fixedly arranged in a direction traversing the raveling direction of the polishing belt, and the polishing belt is swingably arranged. In addition, the swinging means may be also so adapted to swing the holding and pressing means relative to the polishing belt in a plane, in which the polishing belt is supported by the flatly supporting means, and in a direction traversing the traveling direction of the polishing belt, wherein the polishing belt is fixedly arranged in a direction traversing the traveling direction thereof, and the holding and pressing means is swingably arranged. In the present invention, a swing velocity is, for example, approximately 7 m/minute, but the velocity may be determined in conjunction with a traveling velocity of the polishing belt and like factors.

In the present invention, the polishing belt is preferably constructed of an endless belt. The polishing belt comprises at least a supporting layer and buff layer as a polishing layer supported by the supporting layer. The buff layer is made of, for example, felt, leather, sponges, or rubber-base or resin-base materials, and is preferably made of urethane foam or non-woven fabric of polyester fibers. In the present invention, the buff layer is bonded to the supporting layer, or is fused to adhere to the supporting layer.

In addition, the above objects of the present invention are accomplished by the surface polishing machine which further comprises glass plate rotating means for rotating the glass plate in a plane parallel to a plane in which the polishing belt is supported by the flatly supporting means, the glass plate being held by the holding and pressing means.

A rotation speed of the glass plate by rotating means may be determined in conjunction with the traveling velocity of the polishing belt, the size of the glass plate and the like factors, and is preferably, for example, a value of approximately 13 rpm.

Further, the above objects of the present invention are accomplished by the surface polishing machine which further comprises moving means for moving the holding and pressing means. An embodiment of such moving means of the present invention is so adapted to move the glass plate within at least a polishing area for the glass plate in a plane parallel to a plane in which the polishing belt is supported by the flatly supporting means, the glass plate being held by holding and pressing means.

In further embodiment, the moving means is provided with an endless circulation mechanism to which the holding and pressing may be attached to enable the surface polishing machine to continuously perform its polishing operation so that the machine is remarkably improved in operation rate, whereby the cost of polishing the glass plate is drastically reduced.

Now, the present invention will be described with reference to preferred embodiments thereof illustrated in the accompanying drawings to clarify the above inventions, and further inventions, not as a limitation to the present invention.

BEST MODE FOR CARRYING OUT THE INVENTION

Figure 1:
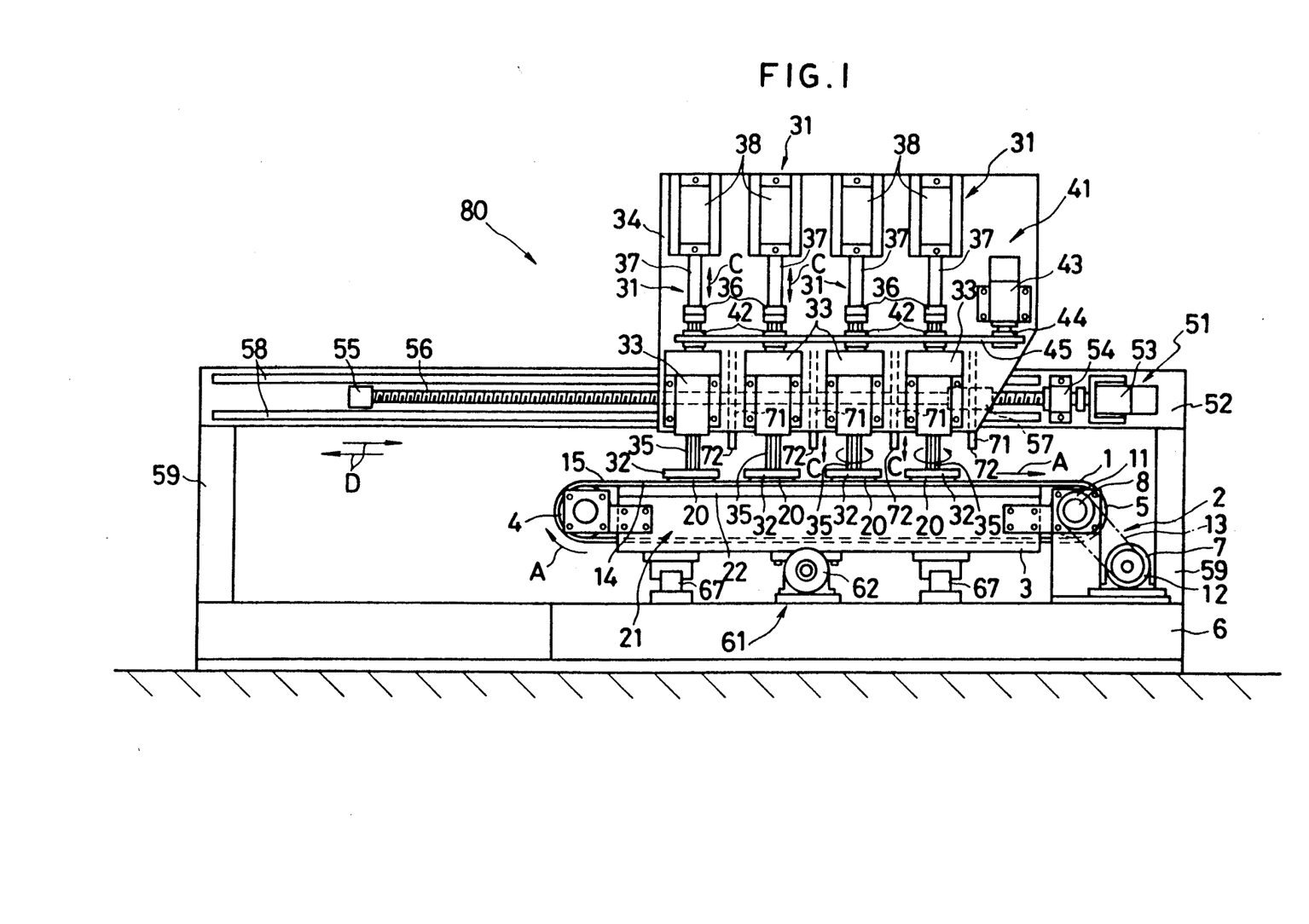
FIG. 1 is a front view of a preferred embodiment of the surface polishing machine of the present invention.
Figure 2:
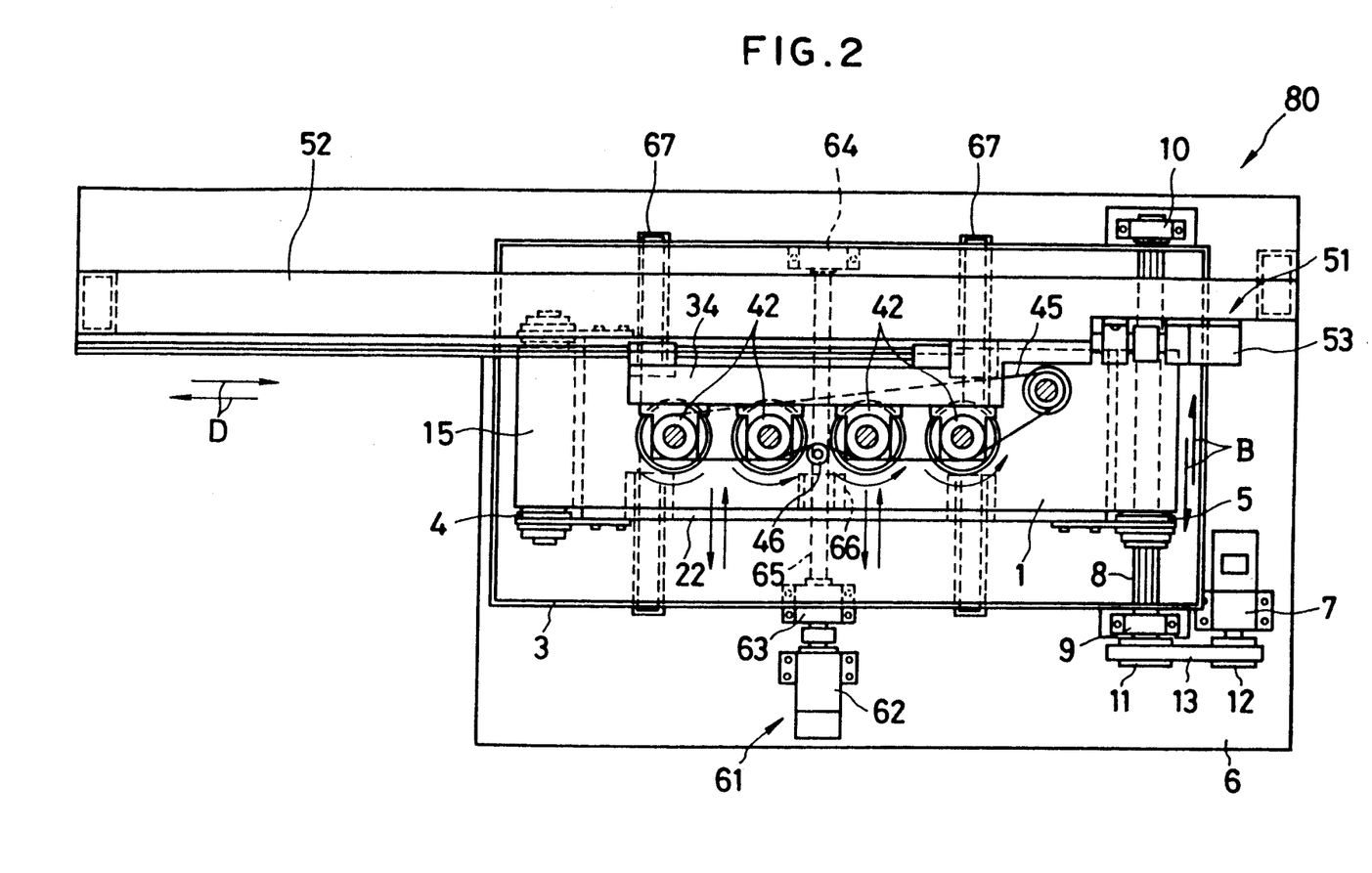
FIG. 2 is a plan view of the embodiment shown in FIG. 1.
Figure 3:
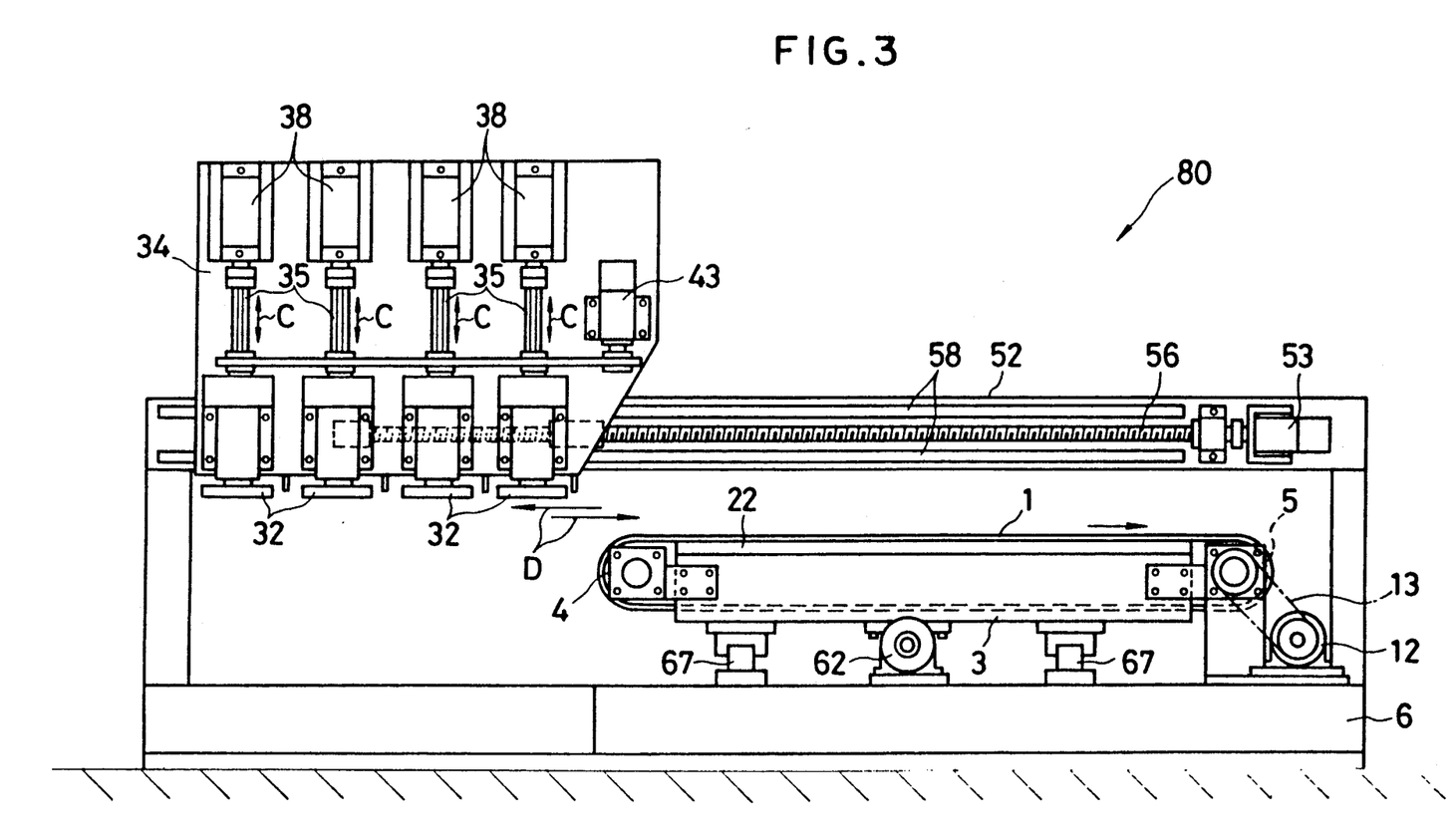
FIG. 3 is a front view of the embodiment shown in FIG. 1, in a state where the glass plate is supplied.

In FIGS. 1 to 3, a traveling unit 2 which carries a polishing endless belt 1 at a velocity of, for example, approximately 150 m/minute in a direction A, is provided with a tail drum 4 and a drive drum 5 both of which are rotatably mounted on a frame 3, and a drive motor 7 mounted on a bed 6. A splined shaft 8 passing through a center of the drum 5 is supported at both ends thereof rotatably on the bed 6 through bearings 9 and 10, and is connected to a splined nut formed on a central portion of the drive drum 5 in a spline manner so that the drive drum 5 is slidably movable relative to the splined shaft 8 in a direction B perpendicular to the direction A. On the other hand, another pulley 12 is mounted on an output shaft of the drive motor 7. An endless chain or belt 13 runs between a pulley 11 mounted on an end of the splined shaft 8 and a pulley 12 mounted on output shaft of drive motor 7, so that when the pulley 12 is rotated by the drive motor 7, the polishing belt 1 is advanced in the direction A through the chain or belt 13 and the drive drum 5.

The polishing belt 1 running between the drive drum 5 and the tail drum 4 has a supporting layer 14 and a buff layer 15 which adheres to an entire outside surface of the supporting layer 14, the polishing belt 1 being uniform in thickness. In the embodiment, the buff layer 15 disposed in the outside surface of the polishing belt 1 is made of urethane foam.

A flat supporting unit 21 which supports the polishing belt 1 in a flat state within a polishing area for glass plate 20, is provided with a supporting plate 22 supported at end portions thereof by the frame 3. The supporting plate 22 is so disposed as to be adjacent to an under surface of an upper traveling portion of the polishing belt 1. In operation, the supporting layer 14 of such upper traveling portion of the polishing belt 1 is brought into a slidable contact with an upper surface of the supporting plate 22 which is so finished as to be excellent in flatness and wear resistance.

A holding and pressing unit 31 holds the glass plate 20 to be polished, and presses the same against an outside surface or buff layer 15 of the polishing belt 1 which is supported by the flatly supporting unit 21 in a flat state within the polishing area for the glass plate 20. The holding and pressing unit 31 is provided with holding cups 32 each for holding the glass plate 20, splined shafts 35, each of which is rotatably supported by a frame 34 through a bearing 33 and is attached at one end thereof with the holding cup 32, and air cylinder units 38, each of which is provided with a piston rod 37 an end portion of which is connected with the other end of each of the splined shafts 35 through a coupling 36, each of the air cylinder units 38 being mounted on the frame 34. The glass plate 20 to be polished is so engaged with and held by the holding cup 32 that the surface to be polished is subjected to an atmosphere. As already described in the above, the splined shaft 35 is rotatably supported by the frame 34 through the bearing 33 and is splined to the bearing 33 so that the splined shaft 35 is movable in a vertical direction relative to the bearing 33, on in the direction C. The coupling 36 is so adapted to prevent the rotation of the splined shaft 35 from transmitting to the piston rod 37 of the air cylinder unit 38. The air cylinder unit 38 moves the splined shaft 35 in the direction C in the activation thereof, so that the holding cup 32 is moved closer to or away from the polishing belt 1. In the embodiment, a plurality of, i.e., four glass plates 20 are simultaneously polished with the use of four holding and pressing units 31 mounted on the frame 34.

A glass plate rotating unit 41 rotates the glass plate 20 at an rotation speed of, for example, approximately 13 rpm in a plane parallel to a plane in which the polishing belt 1 is supported by the flat supporting unit 21. The glass plate rotating unit 41 is provided with pulleys 42 each of which is formed into a splined nut, is splined to the splined shaft 35 and is rotatably supported by the frame 34, and a drive motor 43 mounted on the frame 34. An endless chain or belt 45 runs between pulleys 42 and pulley 44 mounted on an output shaft of the drive motor 43, and is guided by a roller 46 so as to establish a sure engagement with the plurality of the pulleys 42, the guide roller 46 being rotatably mounted on the frame 34.

A moving unit 51 moves holding and pressing unit 31 within at least a polishing area for the glass plate 20 at a moving velocity of, for example, approximately 0.7 m/minute in a direction D in a plane parallel to a plane in which the polishing belt 1 is supported. The moving unit 51 is provided with a drive motor 53 mounted on a lateral member 52, and a threaded shaft 56 which is mounted at both ends thereof rotatably on the lateral member 52 through bearings 54 and 55, is connected at the end thereof with an output shaft of the drive motor 53, and is threadably engaged with a nut 57 fixedly mounted on the frame 34. The frame 34 is supported on the lateral member 52 through a pair of guide rails 58 so as to be movable in the direction D. The lateral member 52 is supported on the bed 6 through a pair of posts 59.

A swinging unit 61 swings the holding and pressing unit 31 relative to the polishing belt 1 in the direction B traversing the traveling direction of the polishing belt 1 and parallel to a plane in which the polishing belt 1 is supported by the supporting unit 21 in a flat condition. In this embodiment, the swinging direction is the direction B perpendicular to the direction A. The swinging unit 61 is provided with a drive motor 62 mounted on the bed 6 and a threaded shaft 65 which is mounted at the both ends thereof rotatably on the bed through bearings 63 and 64, is connected at the end thereof with an output shaft of the drive motor 62, and is threadably engaged with a nut 66 fixedly mounted on the frame 3 which is supported on the bed 6 through a pair of guide rails 67 so as to be movable in the direction B. As described above, in the embodiment, the swinging unit 61 is so connected with the polishing belt 1 through the frame 3 and the like as to swing the polishing belt 1 relative to the holding and pressing unit 31, and is so adapted that a swinging velocity of the polishing belt 1 in the direction B is approximately 7 m/minute.

In the vicinity of the holding cup 32, there is provided one end 72 of abrasive-material supply pipe 71, the other end of the supply pipe 71 being connected with an abrasive-material supply pump (not shown). A mixture of cerium oxides and water may be employed as the abrasive material.

In the above surface polishing machine 80 for the glass plate 20, when the glass plate 20 to be polished is supplied to the polishing machine 80, the frame 34 is positioned in a location shown in FIG. 3, in which location the glass plate 20 to be polished is engaged to the holding cup 32 so as to be held thereby. Then, the threaded shaft 56 is rotated by activation of the motor 53 so that the frame 34 is moved in the direction D, whereby the holding cup 32 is moved to a position above the polishing belt 1. Under such state, both of the air cylinder units 38 and the motor 43 are actuated, so that the splined shafts 35 are moved in the direction C and rotated, to cause the holding cup 32 to rotate and move down and toward the polishing belt 1. When the glass plate 20 held by each holding cup 32 is pressed against the polishing belt 1 under a predetermined pressure, the air cylinder unit 38 stops the downward movement for the holding cup 32, so that the glass plate 20 is pressed against the polishing belt 1 by means of air resilience, wherein the rotation of the glass plate 20 is maintained. The polishing belt 1 has been already traveled in the direction A by the rotation of the splined shaft 8 based on the activation of the motor 7 while already swung in the direction B by the rotation of the threaded shaft 65 based on the activation of the motor 62.

Incidentally, the swing movement of the polishing belt 1 in the direction B is accomplished by actuating the motor 62 to rotate the threaded shaft 65 in forward and reverse direction by a predetermined number of the rotations of the shaft 65. The glass plates 20 held and rotated by the holding cup 32 are pressed against the polishing belt 1 which is traveled in the direction A and is swung in the direction B, whereby a surface polishing operation for the thus rotated glass plates 20 are performed. During the surface polishing operation, the abrasive material is supplied from the ends 72 of the abrasive-material supply pipes 71 onto the polishing belt 1.

After completion of the surface polishing operation, the air cylinder unit 38 is actuated to move the holding cup 32 away from the polishing belt 1. At this time, the drive motor 53 rotates the threaded shaft 56 to move the frame 34 to the location shown in FIG. 3, and the holding cup 32 ceases from rotating. As a result of these operations, the frame 34 carrying the holding cups 32 is positioned at the location shown in FIG. 3, in which location the thus polished glass plates 20 are removed from each of the holding cups 32 so as to be replaced with a new glass plate 20 to be polished. After that, the surface polishing machine 80 repeats the polishing operation in the same manner as that already described in the above.

As described above, in the surface polishing machine 80, since the glass plate 20 is pressed against the polishing belt 1, which is moved linearly in a predetermined direction, to have its surface polished thereby, it is possible to increase the width of each of the polishing belt 1 and the supporting plate 22 of the supporting unit 21 in a simple manner so as to make it possible to polish with high accuracy the glass plate 20 having any size. Namely, it is possible to polish the glass plate 20 without suffering from the size of the glass plate 20. In addition, since the glass plate 20 is polished by the linearly moving polishing belt 1, the polishing speed is constant throughout the width of the belt 1, so that it is possible to polish the surface of the glass plate 20 with extremely high flatness. Further, since the abrasive material supplied onto the polishing belt 1 is substantially free from centrifugal force, it is possible to keep the abrasive material in an optimum state between the glass plates 20 and the polishing belt 1, so that the abrasive material is enhanced in functional effect. In addition, since the surface polishing machine 80 is provided with the swinging unit 61, it is possible to polish in extremely uniform state the surface of the glass plate 20 without any fear of producing a scratch in the surfaces of the glass plate 20.

Figure 4:
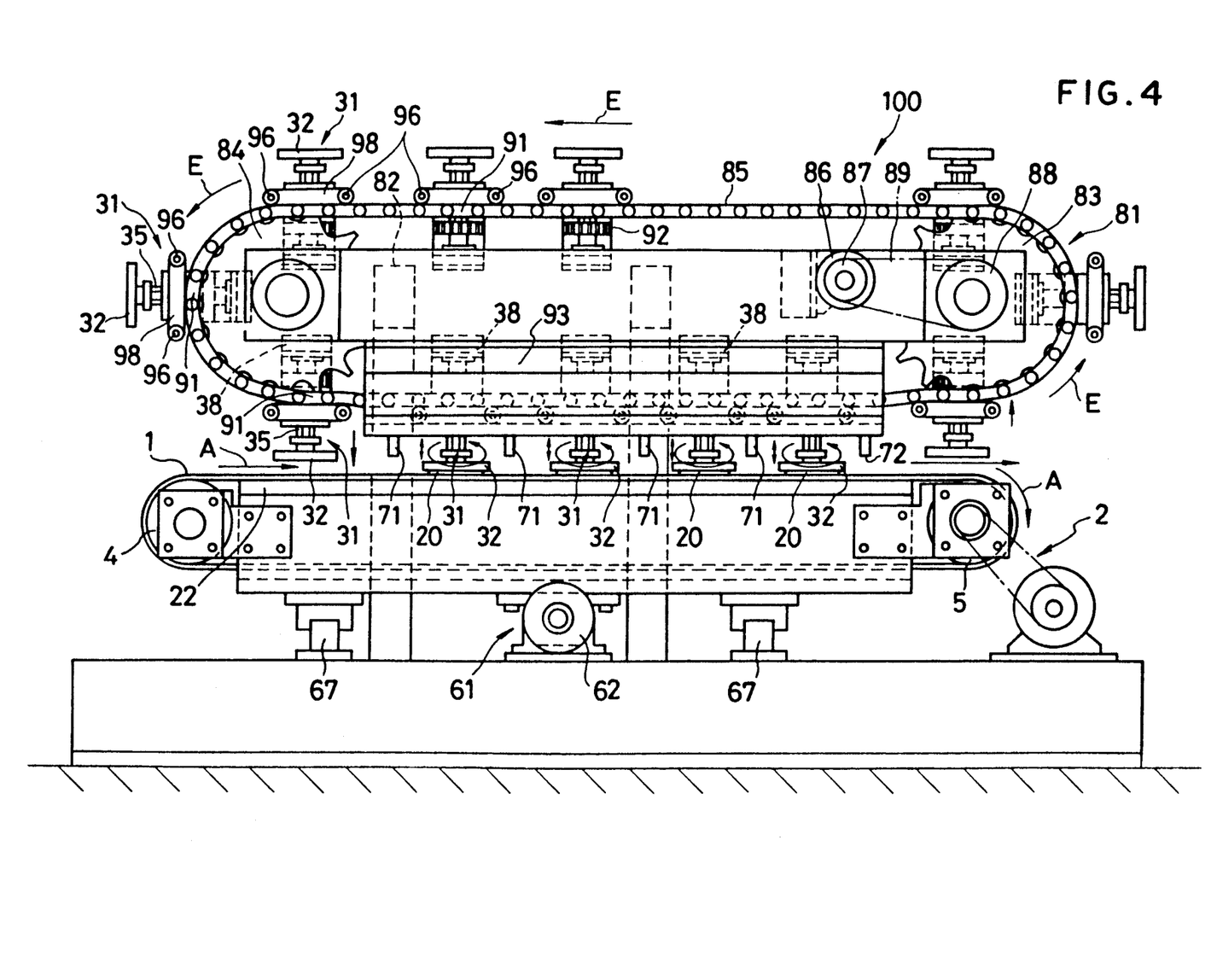
FIG. 4 is a front view of another preferred embodiment of the surface polishing machine of the present invention.
Figure 5:
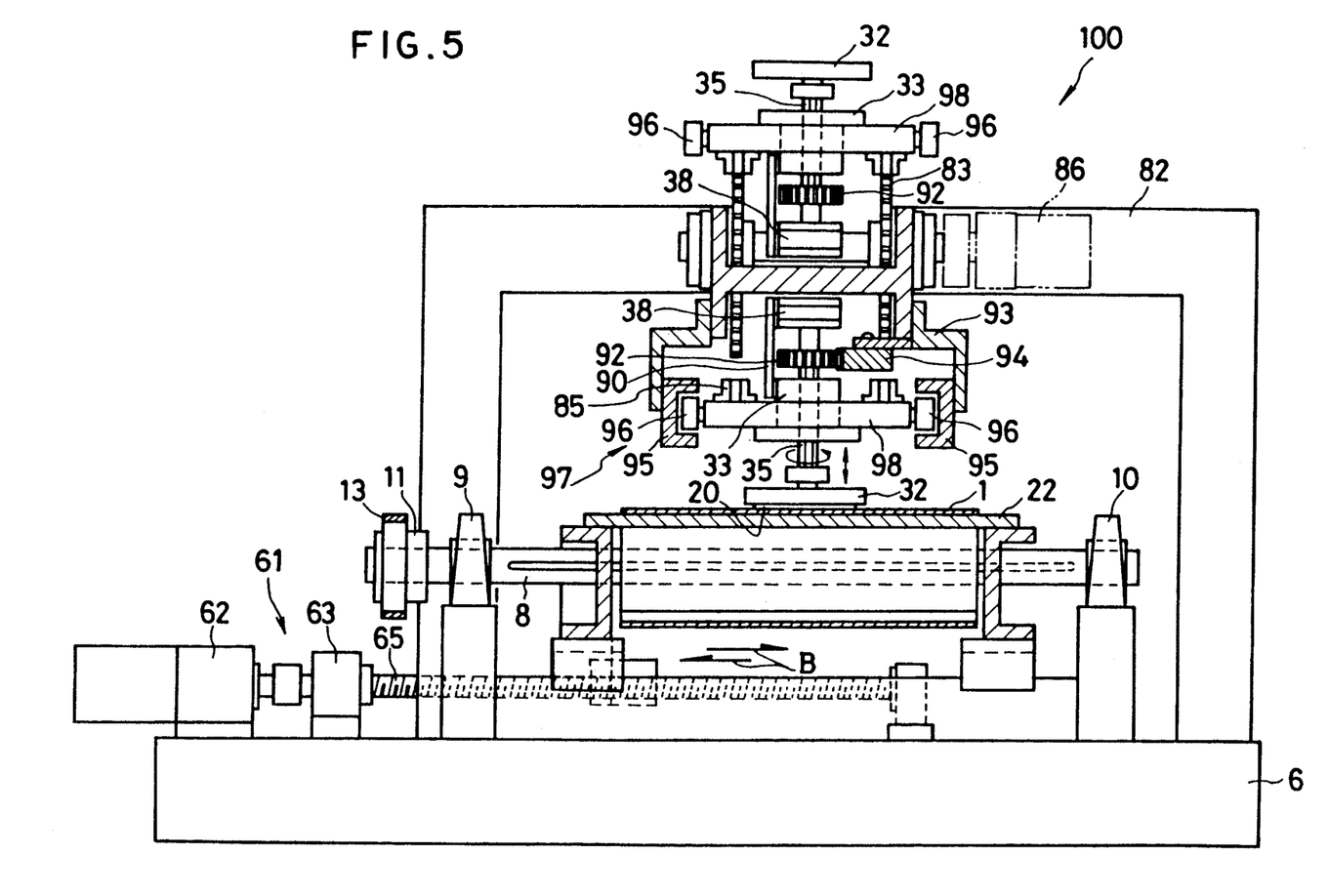
FIG. 5 is a cross-sectional view of the embodiment shown in FIG. 4.

The surface polishing machine 80 for the glass plate 20, though the moving unit 51 is so constructed as to move the frame 34 in a reciprocal manner, it is also possible to replace the moving unit 51 with another moving unit 81 including an endless circulation mechanism so as to construct a surface polishing machine 100 as shown in FIGS. 4 and 5.

As shown in FIGS. 4 and 5, the moving unit 81 is provided with chain wheels 83 and 84 rotatably mounted on a frame 82 which is so mounted on the bed 6 as to bridge across the polishing belt 1, a caterpillar chain 85 running between the wheels 83 and 84, and a drive motor 86 mounted on the frame 82. A belt or chain 89 runs between a pulley 87 mounted on an output shaft of the motor 86, and another pulley 88 mounted on a rotatable shaft of the sprocket wheel 83. When the pulley 87 is rotated by the rotation of the output shaft of the motor 86, the wheel 83 is in turn rotated through the belt or chain 89 and the pulley 88. As a result, also the caterpillar chain 85 is circularly traveled in a direction E at a traveling velocity of, for example approximately 0.7 m/minute.

In the holding and pressing unit 31 of this embodiment, the air cylinder unit 38 is supported through a bracket 90 by the bearing 33 mounted on link plate 91 of the caterpillar chain 85.

The glass plate rotating unit 41 of this embodiment is provided with pinions 92 each of which has a splined nut portion which is meshed with each of the splined shafts 35 in splined connection manner, and a rack 94 fixedly mounted on the frame 82 through a bracket 93, the rack 94 being so arranged as to extend along the caterpillar chain 85 which is traveled in an area immediately over the polishing belt 1. When the pinion 92 is meshed with the rack 94 on traveling of the caterpillar chain 85, the pinion 92 is rotated and then the splined shaft 35 is also rotated.

Further, in the second embodiment, a pair of guide members 95 are mounted on the frame 82 through brackets 93, the guide members 95 extending parallel to a plane, in which the polishing belt 1 is supported, in an area in which the pinion 92 is meshed with the rack 94. The guide members 95 are so adapted as to permit rollers 96 to travel therein. The roller 96 is rotatably mounted on a roller supporting plate 98 which is mounted on the link plate 91. Consequently, the cups 32, each of which is connected with each of the roller supporting plates 98 through each of the bearing 33 and each of the splined shafts 35 is guided by the guide members 95 to travel over the polishing belt 1 along a plane parallel to a plane in which the polishing belt 1 is supported. As described above, this embodiment is provided with a guide unit 97 including the guide members 95, the rollers 96 and the like, to travel the surface of the glass plate 20 to be polished, substantially parallel to the plane in which the polishing belt 1 is supported, during the polishing operation.

Incidentally, the surface polishing machine 100 shown in FIG. 4, although not shown therein, is provided with a glass plate supplying unit for automatically supplying the glass plate 20 to be polished to the holding cup 32, and with a glass plate takeout unit for automatically taking out the polished glass plate 20 from the holding cup 32, the flat-glass supplying unit being disposed in the left side of the machine 100, the takeout unit being disposed in the right side of the machine 100, whereby the surface polishing machine 100 enables to polish the glass plate 20 in sequence.

In the machine 100 having the above construction, the caterpillar chain 85 is traveled in the direction E on actuation of the motor 86 through the pulley 87, belt or chain 89, pulley 88 and the chain wheels 83. When the caterpillar chain 85 is thus traveled, the holding cups 32 travel also in the direction E in sequence. When the holding cup 32 reaches an area immediately over the polishing belt 1, the corresponding air cylinder unit 38 is actuated to lower or move down holding cup 32 which is simultaneously guided by the guide members 95 in traveling, and is rotated by meshing the rack 94 with the pinion 92. As a result of such downward movement of the holding cup 32, the glass plate 20 held by the cup 32 is pressed against the polishing belt 1 traveled in the direction A by the traveling unit 2 while swung in the direction B by the swinging unit 61, whereby the surface polishing for the glass plate 20 is performed. During the polishing operation, the abrasive material is supplied from the one end 72 of the abrasive-material supply pipe 71 onto the polishing belt 1.

After completion of a predetermined polishing operation for the glass plate 20, when the holding cup 32 reaches an area near the drive drum 5, the cup 32 is lifted up by the corresponding air cylinder unit 38 so that the glass plate 20 is separated from the polishing belt 1. At the same time, both of the guiding operation for the cup 32 performed by the guide members 95 and the rotating operation for the cup 32 performed by meshing rack 94 with the pinion 92 are released. And then the polished glass plate 20 is taken out from the holding cup 32 by the glass plate takeout unit. The empty cup 32 is conveyed by traveling of an upper part of the caterpillar chain 85, to a position where the glass plate supplying unit is disposed and a new glass plate 20 to be polished is supplied to the holding cup 32. After that, the same polishing operation as that described above is repeated.

The surface polishing machine 100 is capable of having the same advantageous effects as that of the machine 80. In addition, in the surface polishing machine 100, since the glass plates 20 are polished in sequence without any cease, it is possible to produce the glass plate products at extremely low cost.

Incidentally, in the polishing machine 100, although the glass plate 20 is moved in the same traveling direction as that of the polishing belt 1 during the polishing operation, it is also possible for the machine 100 to reverse the traveling direction of the caterpillar chain 85 so as to move the glass plate 20 in a direction counter to the traveling direction of the polishing belt 1. In this case, the traveling velocity of the polishing belt 1 and that of the caterpillar chain 85 and the like are so set to polish the glass plate 20 at a predetermined polishing speed.

I claim:

1. A machine for polishing a surface of a glass plate, comprising:

a polishing endless belt having a polishing layer in an endless outside surface thereof for polishing the surface of the glass plate;

first moving means connected drivingly to the belt for moving the belt in a predetermined direction, the first moving means having a first drum means and a second drum means spaced from the first drum means, the belt being mounted between the first and second drum means, an intervening planar region of the belt between the first and second drum means defining a polishing area for the glass plate;

supporting means disposed on an inside surface of the belt in the polishing area for supporting the polishing belt in a flat condition in the polishing area;

holding and pressing means for holding the glass plate to be polished and pressing the held glass plate in the polishing area against the outside surface of the polishing belt supported by said supporting means, the first and second drum means each being movable relative to the holding and pressing means in a plane parallel to the intervening planar region and in a direction transverse to the predetermined direction of movement of the polishing belt; and second moving means for moving the first and second drum means relative to the holding and pressing means in a reciprocating motion in the parallel plane and in the transverse direction thereby to move the polishing belt in a reciprocating motion relative to the holding and pressing means in the parallel plane and in the transverse direction.

2. The machine for polishing the surface of the glass plate, as set forth in claim 1, wherein:

the second moving means is drivingly connected to the first and second drum means for moving the first and second drum means in the reciprocating motion in the parallel plane and in the transverse direction.

3. The machine for polishing the surface of the glass plate, as set forth in claim 2, which further comprises:
   glass plate rotating means for rotating the glass plate held by the holding and pressing means, in a plane parallel to a plane of the intervening planar region.

4. The machine for polishing the surface of the glass plate, as set forth in claim 1, which further comprises:
   glass plate rotating means for rotating the glass plate held by the holding and pressing means, in a plane parallel to a plane of the intervening planar region.

5. The machine for polishing the surface of the glass plate, as set forth in claim 1, which further comprises:
   third moving means for moving the holding and pressing means.

6. The machine for polishing the surface of the glass plate, as set forth in claim 5, wherein:
   the third moving means is so adapted to move the glass plate within at least a polishing area in a plane parallel to a plane of the intervening planar region.

7. The machine for polishing the surface of the glass plate, as set forth in claim 6, wherein:
   the third moving means is provided with an endless circulation mechanism on which the holding and pressing means is mounted.

8. The machine for polishing the surface of the glass plate, as set forth in claim 7, which further comprises:
   glass plate rotating means for rotating the glass plate held by the holding and pressing means, in a plane parallel to a plane of the intervening planar region.

* * * * *